(12) United States Patent
Ramos et al.

(10) Patent No.: US 7,813,972 B2
(45) Date of Patent: Oct. 12, 2010

(54) CURRENCY MANAGEMENT

(75) Inventors: Antonio Carlos Menezes Ramos, Rio de Janeiro (BR); Marcelo Ferreira Pinto Zacarias Domingues, Sao Paulo (BR); Marcelo Gerardi Zambrana, Sao Paulo (BR); Luiz Ricardo Leal Da Costa Antiqueira Elias, Santana do Parnaiba (BR); Claudio Minerbo, Sao Paulo (BR)

(73) Assignee: Accenture Global Services GmbH

( * ) Notice: Subject to any disclaimer, the term of this patent is extended or adjusted under 35 U.S.C. 154(b) by 1702 days.

(21) Appl. No.: 10/215,671

(22) Filed: Aug. 9, 2002

(65) Prior Publication Data

US 2004/0030622 A1 Feb. 12, 2004

(51) Int. Cl.
*G06Q 20/00* (2006.01)
(52) U.S. Cl. ....................................................... 705/28
(58) Field of Classification Search .................... 705/25, 705/8, 28
See application file for complete search history.

(56) References Cited

U.S. PATENT DOCUMENTS

| | | | | |
|---|---|---|---|---|
| 5,450,317 A | * | 9/1995 | Lu et al. ........................ | 705/10 |
| 5,748,737 A | * | 5/1998 | Daggar ........................ | 705/41 |
| 5,799,288 A | * | 8/1998 | Tanaka et al. ................. | 705/43 |
| 5,819,232 A | * | 10/1998 | Shipman ........................ | 705/8 |
| 5,884,300 A | | 3/1999 | Brockman | |
| 5,960,414 A | | 9/1999 | Rand et al. | |
| 5,983,198 A | * | 11/1999 | Mowery et al. ................ | 705/22 |
| 6,006,196 A | * | 12/1999 | Feigin et al. ................... | 705/10 |
| 6,092,731 A | | 7/2000 | Smith | |
| 6,249,774 B1 | | 6/2001 | Roden et al. | |
| 6,260,047 B1 | | 7/2001 | Fox et al. | |
| 6,390,366 B1 | * | 5/2002 | Heidenreich et al. ......... | 235/384 |
| 6,937,992 B1 | * | 8/2005 | Benda et al. ................... | 705/7 |
| 6,988,078 B1 | * | 1/2006 | Heidenreich et al. ......... | 705/22 |
| 7,219,083 B2 | * | 5/2007 | Bellucci et al. ............... | 705/43 |
| 2005/0075949 A1 | * | 4/2005 | Uhrig et al. ................... | 705/28 |

FOREIGN PATENT DOCUMENTS

| | | | |
|---|---|---|---|
| JP | 2002032569 A | * | 1/2002 |
| WO | WO02/054172 | | 7/2002 |

OTHER PUBLICATIONS

Distribution Strategies that Minimize Transportation and Inventory Costs, Burns et al, vol. 33, No. 3 (May 1985) Operations Research, pp. 469-490.*

(Continued)

*Primary Examiner*—Alexander Kalinowski
*Assistant Examiner*—Ann Loftus
(74) *Attorney, Agent, or Firm*—Fish & Richardson P.C.

(57) ABSTRACT

Management of currency inventory within and among network nodes of a financial network (e.g., bank branches, ATMs, and kiosks) may involve receiving information of currency inventory at one or more nodes in the network, generating a forecast for currency demand for the one or more nodes based on the historical currency demand for the one or more nodes, and establishing a currency transportation plan that includes a currency delivery schedule for the one or more nodes, wherein the currency transportation plan is based on the currency inventory, the forecast for currency demand, and one or more costs of handling currency. The costs of handling currency may include costs such as the expected loss from robbery and other currency theft.

9 Claims, 14 Drawing Sheets

OTHER PUBLICATIONS

Brinksinc.com as archived by http://web.archive.org from Jun. 2001.*

Diebold International Ltd Forms Strategic Marketing Agreement with Transoft International; Company to provide Cash Management Solution to customers in Europe, Middle East, and Africa, PR Newswire, Sep. 25, 2002.*

Voluntary Amendment filed with the Australian Patent Office on Apr. 1, 2009, 11 pages.

Examiner's Report No. 2 on patent application 2003265071 by Accenture Global Services GmbH, Apr. 30, 2009, 2 pages.

Australian Patent Office Amendment in Reply to Examiner's Second Report dated Apr. 30, 2009 in AU Appl. No. 2003265071, filed Jun. 19, 2009, 5 pages.

* cited by examiner

- Demand Distribution per Hour -

| Time | Deposits | Withdrawals | Self-Service Withdrawals | ATM Withdrawals |
|---|---|---|---|---|
| 10 | 5% | 20% | 20% | 20% |
| 11 | 10% | 20% | 20% | 16% |
| 12 | 15% | 15% | 15% | 7% |
| 13 | 15% | 20% | 20% | 7% |
| 14 | 15% | 15% | 15% | 5% |
| 15 | 40% | 10% | 10% | 5% |
| Night | 0% | 0% | 0% | 40% |
| | 100% | 100% | 100% | 100% |

- Demand Forecast Table

| | Peak Days | | | | | | | Normal Days Fortnight 1 | | | | | | | Normal Days Fortnight 2 | | | | | | |
|---|---|---|---|---|---|---|---|---|---|---|---|---|---|---|---|---|---|---|---|---|---|
| | Sun | Mon | Tue | Wed | Thu | Fri | Sat | Sun | Mon | Tue | Wed | Thu | Fri | Sat | Sun | Mon | Tue | Wed | Thu | Fri | Sat |
| Deposits | | 150 | 120 | 105 | 120 | 150 | | | 100 | 80 | 70 | 80 | 100 | | | 90 | 70 | 70 | 60 | 90 | |
| Withdrawals | | 75 | 60 | 50 | 60 | 75 | | | 50 | 40 | 35 | 40 | 50 | | | 45 | 40 | 30 | 38 | 47 | 35 |
| Self-Service | | 38 | 30 | 25 | 30 | 38 | | | 25 | 20 | 18 | 20 | 25 | | | 20 | 18 | 15 | 17 | 22 | |
| ATM | 30 | 45 | 38 | 30 | 38 | 45 | 60 | 20 | 30 | 25 | 20 | 25 | 30 | 40 | 18 | 27 | 24 | 20 | 23 | 28 | 35 |

| | | Tariffs | | | | | |
|---|---|---|---|---|---|---|---|
| | | Contract | | Supply | | Collection | |
| Code | Agency | Supply | Collection | Routine | Eventual | Emergency | Routine | Eventual | Emergency |
| 31 | 1st National Bank - Smithton | R | R | 1,250.26 | 75.86 | 107.08 | 1,250.26 | 107.08 |
| 55 | Central Bank - Jonesboro | R | R | 1,250.26 | 75.86 | 107.08 | 1,250.26 | 107.08 |
| 104 | The People's Bank - Smithton | R | R | 1,250.26 | 75.86 | 107.08 | 1,250.26 | 107.08 |
| 106 | 1st National Bank - Downtown | R | R | 1,241.02 | 75.86 | 106.33 | 2,482.04 | 106.33 |
| 127 | 1st National Bank - Village | R | R | 1,250.26 | 75.86 | 107.08 | 2,500.52 | 107.08 |
| 130 | Central Bank - Lanesboro | R | R | 1,249.82 | 75.86 | 106.99 | 1,249.82 | 106.99 |

Fig. 9

| | | Outside Working Hours | | | | | |
|---|---|---|---|---|---|---|---|
| Region | Time | Amount Robbed | Amount Preserved | Robbery Rate | Occurrences | # Branches | Daily Robbery Prob. |
| 1 | Outside | 44149.24 | 37000.00 | 54% | 2 | 59 | 0.0056% |
| 2 | Outside | 556313.49 | 870149.31 | 39% | 17 | 60 | 0.0467% |
| 3 | Outside | 156619.47 | 762189.00 | 17% | 9 | 59 | 0.0251% |
| 4 | Outside | 456555.11 | 192689.69 | 70% | 9 | 64 | 0.0232% |
| 5 | Outside | 552979.25 | 306222.37 | 64% | 10 | 53 | 0.0311% |
| 6 | Outside | 1766616.56 | 2168250.37 | 45% | 47 | 295 | 0.0262% |

Fig. 10

CURRENCY MANAGEMENT

TECHNICAL FIELD

This application pertains to a currency management system. In particular, the system provides for the efficient allocation and distribution of currency (or cash) to entities, such as branches, kiosks, and automated teller machines (ATMs), managed, owned, or operated by a financial institution or multiple financial institutions.

BACKGROUND

Financial institutions, such as banks, need to provide a high level of service while reducing costs below those of their competitors. One of the most important roles of a financial institution is to provide currency to customers when the customers need the currency, and where they need it. Most banking customers have come to expect that their financial institution will, at all times, have cash sufficient to satisfy reasonable requests for withdrawal. Therefore, it is important that a financial institution have adequate cash inventory on hand to meet any likely demand. It is also important that the financial institution have an appropriate mix of currency.

The need to have adequate cash on hand, however, imposes high costs on financial institutions. For example, transportation costs for moving currency are generally much higher for currency than for other types of goods because of the need for high security, such as armored cars. In addition, financial institutions make much of their profit by carefully handling and managing money, so that currency needlessly sitting in a bank branch directly costs the financial institution money. In addition, tracking and counting of currency is highly labor intensive, so it is particularly important that currency be moved within a financial institution in a most efficient manner. Moreover, unlike with other inventory management situations, where deposits (i.e., returns of merchandise) are rare, financial institutions regularly must handle deposits of currency.

The challenges of managing cash inventory have increased more recently. In particular, more locations are available for the withdrawal of cash, with the introduction of kiosks and ATMs. In addition, each type of location—whether branch, kiosk, or ATM—may have a unique supply and demand pattern for currency. For example, an ATM will generally have a much smaller capacity than will a branch. Also, an ATM may make cash available at all hours, while a traditional branch generally closes at night. In addition, while cash deposits at a branch can generally be used immediately to satisfy withdrawals, cash deposits at an ATM are generally sealed in envelopes and the cash may not be given to other customers until the machine has been emptied and the transaction has been processed.

Despite the importance of careful currency management in financial institutions, many demand management systems for currency have depended on estimates and rules of thumb. For example, often branch managers use their intuition and past experiences to determine the amount of cash that will be needed. Alternatively, cash may be delivered on a set schedule that depends only upon the amount of cash currently on hand and the amount of time until the next delivery of cash. Generally, these methods do not take into account the costs and risks associated with security of the money, both in storage (for example, at a branch or in an ATM) and in transportation.

SUMMARY

A system and method are provided for managing currency distribution, such as the distribution of cash from a central storage facility to various nodes, such as bank branches and ATM's, in a financial institution's network. In one aspect, the invention discloses a currency management method that receives information of currency inventory at one or more nodes, generates a forecast for currency demand for the one or more nodes based on their historical currency demand, and establishes a currency transportation plan that includes a currency delivery schedule, wherein the currency transportation plan is based on the currency inventory, the forecast for currency demand, and one or more costs of handling currency.

In another aspect, a computer-implemented system comprises a plurality of network nodes that each distribute and receive currency and that have a current currency balance. A demand planning module is programmed and configured to create a currency demand forecast for one or more nodes using historical currency intake and output data for the nodes. A transportation planning module is programmed and configured to create a plan for transporting currency to one or more nodes using the currency demand forecast and the currency handling costs.

In various embodiments, the method and system may have further features and refinements. For example, the currency handling costs may include the expected loss of currency from robbery. The transportation plan may minimize the costs of handling currency, and may include a delivery schedule that specifies currency deliveries to each node for a predetermined period. The currency forecast may be generated using statistical distributions or Monte Carlo simulation, and may include the expected currency demand for multiple periods within a single day. In addition, the transportation plan may be responsive to mandatory currency limits, including limits relating to regulatory limits on currency inventory, which may be set for one or more nodes. As another feature, transportation plans may be manually reviewed and may be adjusted based on such a review. In addition, a currency delivery amount may be determined as part of the transportation plan.

In various implementations, the invention may provide one or more of the following advantages. The techniques, systems, and methods described herein result in an integrated solution for efficient and cost-effective management of currency within a financial system or sub-system. Currency may be managed in a more systematic manner than in the past, so that the costs associated with managing, transporting, and otherwise handling currency may be minimized. Predictable fluctuations in currency demand may be accounted for, so that currency inventory is adequate to meet demand. Managers may participate in the automated planning process and may review and edit plan parameters. The invention is capable of interfacing to an existing computer environment seamlessly. As a result of being capable of handling different operating environments, the system may quickly be deployed in many different existing financial institutions and may thus provide swift improvements in business performance.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 9 shows a table of the transportation costs for a branch.

FIG. 10 shows a table of expected robbery costs.

Like reference symbols in the various drawings indicate like elements.

DETAILED DESCRIPTION

Figure 1:
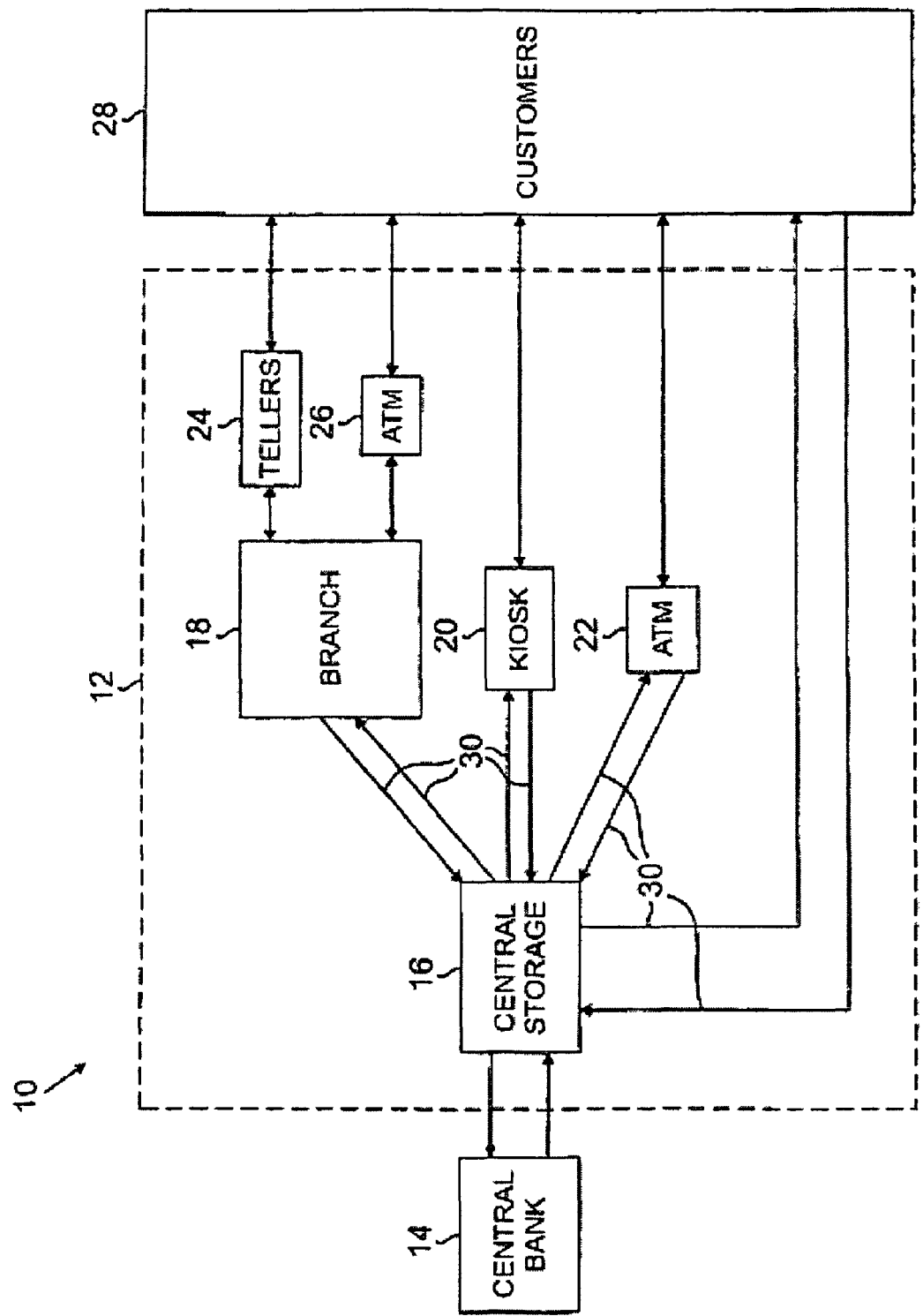
FIG. 1 is a simplified block diagram of a currency distribution system.

FIG. 1 is a simplified block diagram 10 of a currency distribution system 12. Currency generally begins its flow into system 12 at a central banking facility 14, where newly minted or printed currency is placed into circulation. The currency may be distributed to one of a number of private financial institutions, and for example, to one or more of an institution's central storage facilities 16. In addition, central banking facility 14 may accept worn currency for destruction. Moreover, central banking facility 14 may redistribute existing currency by accepting it from one financial institution and providing it to another institution.

Each financial institution may, through its currency distribution system 12, provide for the flow of currency to nodes in the system. The nodes may include entities such as bank branch 18, banking kiosk 20, or ATM 22. A node could also include a combination of a branch, along with one or more ATMs or kiosks associated with that branch. In addition, a node could include multiple branches, ATMs, or kiosks, or other such facilities that handle currency. Each node can generally receive currency from, or provide currency to, the institution's central storage facility 16 or facilities, whether directly or indirectly. In addition, kiosk 20 and ATM 22 may provide currency to customers 28 of the financial institution in the form of cash withdrawals, and may receive currency from customers 28 in the form of cash deposits. Bank branch 18 may also provide cash to, or receive cash from, customers 28, either through human tellers 24 or ATMs 26 located on or near the premises of bank branch 18. In addition, it is possible for the financial institution to deliver cash directly to customers 28, or receive cash directly from customers 28, from central storage facility 16. For example, large corporate customers of the financial institution may have currency needs that may not be met efficiently through a bank branch or ATM.

Currency may be transported by or for the financial institution via transportation routes 30. Generally, most transportation for which the financial institution is responsible will occur from its central storage facility 16 or facilities to the numerous nodes in the financial network. This transportation generally occurs over the road using armored cars driven by armed guards. The cost of transporting currency, both directly through equipment and manpower, and indirectly, through the risk of robbery and other losses, can be a very high cost for a financial institution. The illustrated system may be arranged to account for both direct and indirect transportation costs and other handling costs, as discussed below.

Figure 2:
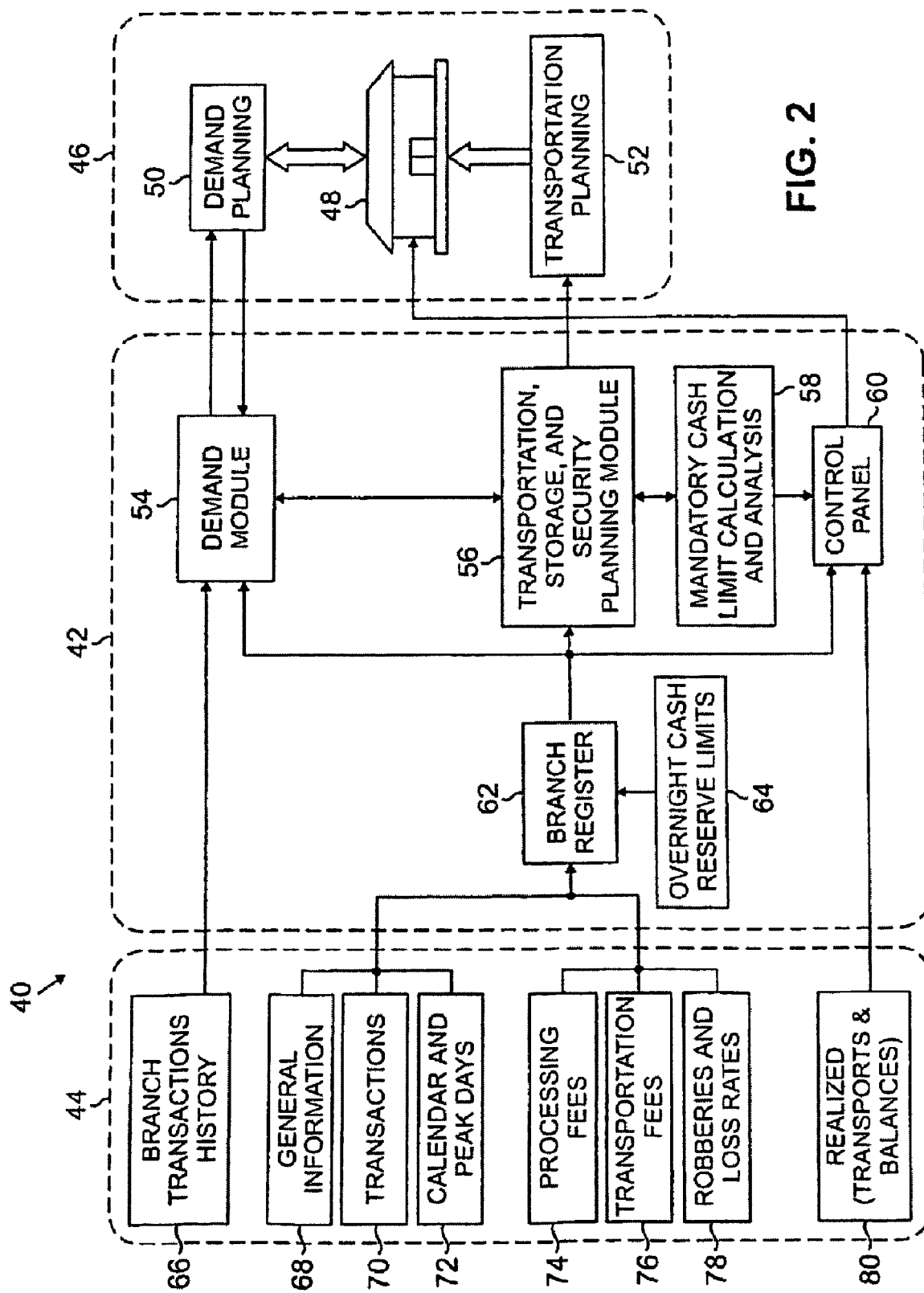
FIG. 2 is a simplified block diagram of an arrangement for managing currency flow for a financial institution.

FIG. 2 is a simplified block diagram of an arrangement 40 for managing currency flow for a financial institution. In the figure, currency management system 42 receives inbound data 44 and produces outbound data 46. Although inbound data 44 and outbound data 46 are shown as existing outside system 42 for clarity, any or all of the data may reside internally to system 42. In addition, although the arrows connecting various blocks show the general flow of information, information can also flow in a direction opposite to the arrows, and additional or alternative categories of information may be used.

Currency management system 42 produces information that may be used by demand planning module 50 to predict the demand of currency and various types and sizes of currency needed by node 48. Node 48 could be a traditional free-standing bank branch office, or could be any other entity or entities in a financial system that handle currency, such as a kiosk or an ATM, or a combination of branches, kiosks, ATMs or other such facilities. Demand planning module 50 can receive information from demand module 54 and may pass the information on to node 48, either with or without modification. In particular, demand module 54 may identify and analyze changes in demand, using historical demand data as an input, and may create demand forecasts for various time frames and on a rolling basis. Demand planning module 50 may then forward the information generated in demand module 54 to node 48, where the information may be edited, for example, by a branch manager. As an example, the branch manager may analyze the demand for withdrawals predicted by the demand module 54 (through, for example, a user interface associated with demand planning module 50) for the next week and conclude that the values predicted are low, due to some particular event that will occur close to the branch locations that will increase the branch's withdrawal for the coming week. The branch manager may adjust the value of withdrawals through the demand planning module 50. The edited data from node 48 may then be sent back to demand module 54 so that demand module 54 may further refine its prediction of the anticipated currency demand for node 48, and can also take into account the anticipated demand of other nodes.

Demand module 54 identifies and analyzes changes in demand, using historical data as input. In particular, the module looks to currency inflows and demands from the past, and uses this information to create a statistics-based projection for future demand. The demand module 54 may first identify statistical outliers for each demand component (e.g., deposits, withdrawals, ATM demand, etc.) for each day of the week, and for the first and second month fortnight of a month. The module eliminates the historical data ($Y_i$) that is not true in the following comparison:

$$-(F/100)<(Y_1-Y_m)/\sigma<(F/100);$$

where F is a factor defined by the user, and delimits the range in which the demand will be accepted; σ is the standard deviation found in the historical data; $Y_i$ is the historical data; and $Y_m$ is the average of the historical data for the particular component and period. After eliminating the outliers, for each demand component, demand module 54 may calculate a line equation for each day of the week, each fortnight, and every demand component. The extension of the line provides a demand forecast by node. Events that might influence the demand in a branch may cause demand module 54 to increase or decrease the forecasted demand for a certain period, for example, by a percentage or an absolute value, such as a value provided by a branch manager. Other appropriate forecasting methods could also be used.

Demand module 54 may also calculate the time curve and the minimum cash reserve for each branch. The time curve represents the projected cash amount that will be used for each branch and ATM per working hour. The minimum cash reserve calculation refers to the amount of cash that should be kept at a branch or ATM overnight so that adequate funds are available before it is possible to obtain cash replenishment, such as during the first hour of the following day.

Currency management system 42 also includes a transportation, storage, and security planning (TSSP) module 56 that sends data to transportation planning module 52. The data may include information about the parameters and transportation plan for the branch for the coming week, such as the overnight storage limit, amount of armored car stops available to supply or collect currency, and average overnight balance. Transportation planning module 52 may then make the data available, either in its original form or in a revised form, to node 48. The data may be sent to node 48 in the form of an interactive spreadsheet, and may contain the demand forecasted for node 48 in demand module 54. The branch manager may consult the data to decide when to make shipments of currency and what types or sizes of currency to make available. In this manner, the branch manager can plan for certain currency needs and direct the branch staff to handle currency accordingly.

In the main, TSSP module 56 seeks to reach a balance between the cost of storing currency and the cost of transporting it, and to minimize the overall cash on-hand processing costs (OCPC). Storage and transportation both have a number of different costs. For example, there are certain transaction costs involved with complying with central banking regulations. Storage costs in particular involve the cost of storing currency in centralized vaults, and thus include lease, utility, personnel, maintenance, insurance, and other such costs. Transportation costs can include personnel, vehicle costs, maintenance, fuel, and insurance if the financial institution owns its own transportation system, and can include contracted prices per stop if the financial institution does not do its own currency transportation. For ATM branches, there are additional ad valorem rates, and additional security concerns and costs, especially where the ATM is in a high-risk area or is a portable ATM. Furthermore, every mode of transportation or storage can involve certain additional processing costs.

Mandatory cash limit calculation and analysis (MCLCA) module 58 may interact with TSSP module 56 to limit the manner by which currency can be supplied to any particular branch or group of branches. MCLCA module 58 takes into account certain rules that apply to the currency inventory at a node or nodes. For example, government regulations may place a minimum limit on the amount of currency that must be available at a given branch or ATM, or throughout a financial system or sub-system. That minimum balance may be designed to ensure that adequate cash is on hand to meet expected or even unexpected customer demand. Such a limit may also be enforced by the financial institution itself rather than by the government.

Mandatory cash limit relates to the total currency in a financial network, and may be calculated based on branch and ATM balances, supply and collection amounts, and the currency that is in-transit. MCLCA module 58 may calculate the mandatory cash limit generated by the transportation plan and may produce a report that lists the branches in decreasing order of representativeness for the coming week. Branches having the highest currency balance and consequently, highest representativeness in the mandatory cash limit (MCL) may be "drained" so that the overall balance for the system is near the required minimum.

Personnel at node 48 may be provided with an opportunity to review and revise the node's demand plan before a transportation plan is generated. The information may be provided to a branch manager at node 48 through, for example, a web browser interface working through a virtual private network (VPN) or by other well-known means. The branch manager may review the demand forecast for the coming week, and may alter the day-by-day values or other values in the forecast, for example, if the manager expects a significant event to affect withdrawals. The changes made by the branch manager occur through demand planning module 50, may be sent to demand module 54 and may be used by the TSSP module 56 to determine the following week transportation plan.

Control panel 60 may serve as a centralized module for reviewing and changing data related to system 42. In one embodiment, it may be an application program that may be accessed by multiple employees at a financial institution, such as a central database user interface. Control panel 60 may be used to analyze data for future currency management so as to fine-tune a currency management plan. Control panel 60 may also provide access to data related to past currency transactions for auditing purposes. For example, control panel 60 may allow central managers or branch managers to review the amount of currency on-hand at one or more branches, the number of unnecessary currency collections at a branch or branches, the high average balance for a branch, and other metrics of currency management performance. In addition, control panel 60 may permit inquiries relating to forecast, analyzed, promotional, or actual currency demands. It may also allow for the determination of a current day's cash balance, cash amount collected, and whether a branch has exceeded its overnight cash reserve limit or if collection occurred before the cash limit was reached.

Control panel 60 may also be programmed and configured to provide information via reports. For example, it may generate reports that compare forecast parameters to actual parameters for a node or a collection of nodes. The parameters on which reporting may occur include whether and to what extent certain predetermined limits (such as overnight cash limit) have been exceeded, the average currency balance of a node or collection of nodes, the number and average size of currency shipments to a node or collection of nodes, and the amount supplied and collected. In addition, points may be applied to certain parameters or events to provide a convenient means for tracking a branch's currency management performance. For example, points may accumulate for a branch that has exceeded its overnight cash reserve limit, or that required a higher than necessary number of cash deliveries. Reports may be generated for a single branch or for a region, and may also be generated for a particular date or date range, so as to allow a complete audit of currency operations.

Although control panel 60 is illustrated as a single module, it could consist of a number of separate modules, each assigned to a particular task. In addition, it could be comprised of any combination of user interfaces, computer hardware, database queries, collections of data, report generators, or other devices or methods for providing access to data. By way of example, control panel 60 could employ an HTML-based interface and use XML tags and .NET tech or Java technology.

In addition, control panel 60 may present information in a number of different forms. For example, control panel 60 may allow querying of data either through manually-constructed queries, through automatic queries, through forms, or through automatically generated reports. Control panel 60 may present the data or results of a query through a particular computer application (such as a database front-end), via an intranet, or over the Internet, for example, on a virtual private network (VPN). Control panel 60 may be accessed by central management, and certain personnel may also be given selective access to control panel 60.

Branch register 62 may accept, store, and provide information related to various branches, or nodes, associated with a financial institution or institutions. Generally, branch register 62 centralizes data that is needed by other modules in the system, such as the number of ATMs associated with a branch, the branch address and location, the branch's security index, supply and collection transportation costs, and an ATM's cash storage capacity. Each branch may also be assigned an overnight cash reserve limit (OCRL) 64, which may place a limit on the amount of currency that may be stored at a branch overnight. The OCRL 64 for a branch or branches may be provided to the rest of system 42 through branch register 62 or by other means. The OCRL also may be stored as part of branch register 62.

Various types of data, shown in the figure as in-bound data 44, may be used by system 42. For example, demand module 54 in system 42 may receive data on a branch transactions history 66. This data represents the deposits and withdrawals of currency by a particular branch or a group of branches (also referred to as a node or group of nodes). Branch register 62 may receive data regarding general information 68, such as the name of a branch, the location of the branch, and the owner of the branch. Information may also come from transactions file 70, which contains data on transactions that have been completed by a branch or branches, and from calendar and peak days file 72, which stores information regarding days in which one or more branches may not be operating (such as holidays) or days on which there is expected to be an unusual demand for currency (such as local paydays or certain days of the week or month). Other files contain data on particular costs of doing business for a financial network, such as processing fees 74, transportation fees 76, and robbery and loss rates 78.

Realized data 80 is data regarding the performance of the branch in past weeks, such as the number of times the branch sought collections and supplies of currency, the branch's overnight balance, and the amount of deposits and withdrawals. The realized data 80 may be used by control panel 60 to verify if the branch is working according to the weekly transportation plan and also to compare the amount of deposits and withdrawals that took place in the branch with the demand forecast calculated by the system and with the demand analyzed and changed by the branch manager. The realized data may also be used as historical data to calculate future projections for a node or nodes in a network. The realized data may be updated on a daily basis or other appropriate basis.

Figure 3:
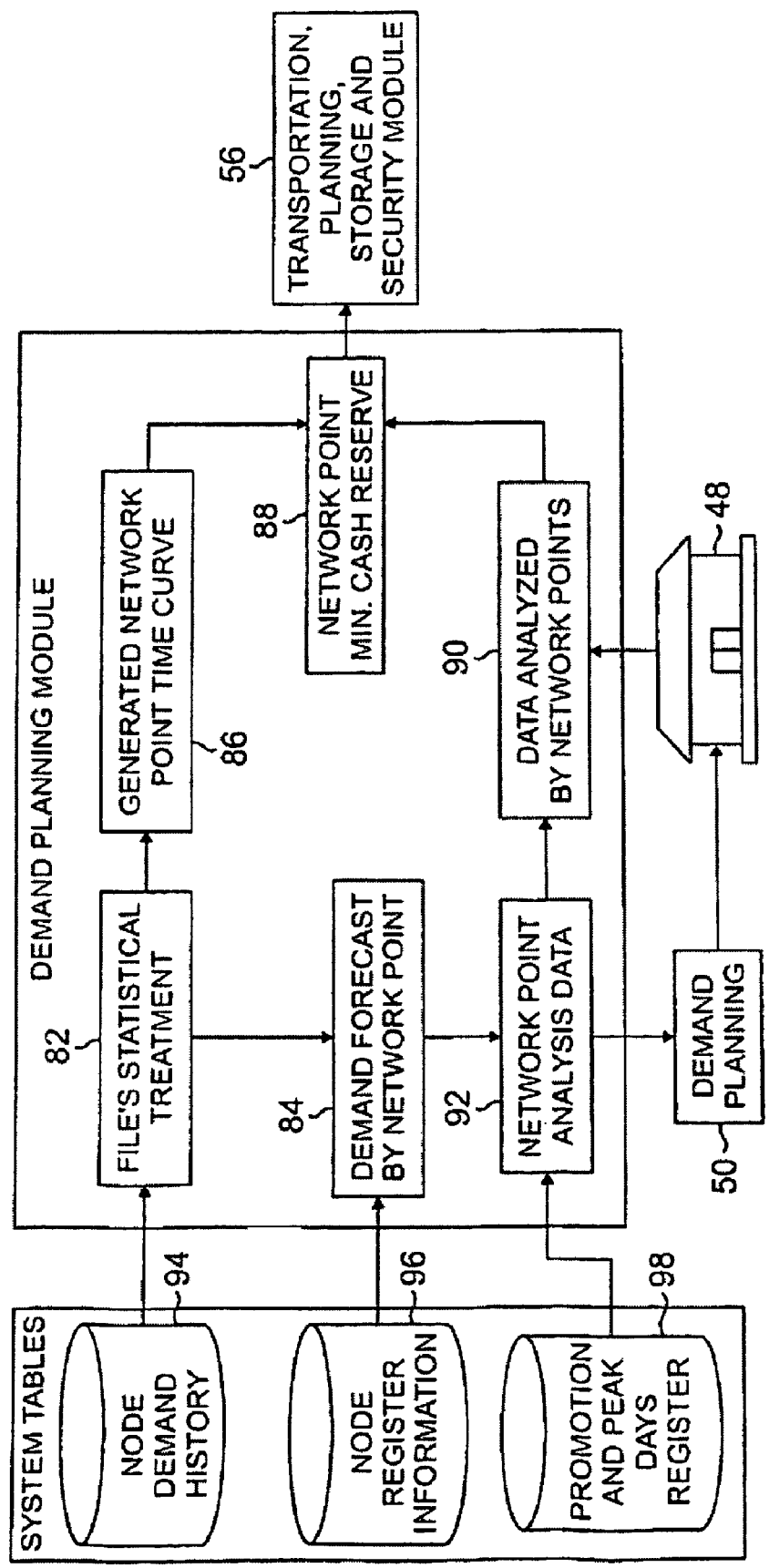
FIG. 3 is a simplified block diagram showing a demand module.

FIG. 3 is a simplified block diagram showing demand module 54. In general, demand module 54 analyzes historical demand data and applies statistical functions to that data to generate an anticipated currency demand for one or more branches, or nodes, in a financial network. Statistical treatment component 82 applies statistical analysis, for example, as described above, to node demand history 94 to forecast likely currency demand for a branch or branches.

Demand forecast 84 may be prepared periodically for one or more nodes based on statistical treatment 82, and using node register information 96 or other appropriate data. Central management or one or more branches may also be given the opportunity, before demand forecast 84 is prepared, to analyze and change the information used to calculate the forecast so as to make the information reflect recent changes or to correct errors in the information. Alternatively, changes may be made to the information after a forecast is prepared, and the forecast may be re-run, or the results of the prior forecast may be adjusted manually or automatically. New information may also be applied to the appropriate databases so that the information is available and accurate in the future. Once finalized, the demand forecast determines the inbound and outbound currency operations for each branch or node for the coming time period.

Time curve processor 86 may determine the currency demand forecast for each network node for each working hour within a day, or other appropriate time period. As a result, additional currency may be made available by deliveries at certain times of the day, if necessary. Underlying the calculations is the minimum cash reserve requirement 88 for each network node, which may be, for example, the amount of currency that should be kept at a node overnight so that it might be available to customers on the first hour of the following day, before the node can obtain a currency replenishment. Minimum cash reserve requirement 88 may be a "hard" number, allowing for no deviation, or it can be a "soft" number that affects the calculation of currency needed by a node, but allows some flexibility in the minimum overnight balance.

As noted, central management or branches may review demand planning information before a final plan is implemented. For example, currency demand that has been planned, shown by box 92, may be reviewed before it is used to generate a transportation plan or a storage plan, so as to verify that the planned demand reflects expected demand. For example, the data may be made available to demand planning 50 and may be analyzed by personnel at network node 48, such as a bank branch. The data may then be fed back into demand module, as shown by box 90, and used for further planning. Such review may take place on a predetermined basis, such as once per week, on a rolling daily basis, or on any other similar basis. For example, branch managers may be allowed to review the forecast inbound and outbound cash operations (withdrawals and deposits) for each day of the week that follows the current week, and may be given the opportunity to change the information up until a particular day of the week, when the information is forwarded, for example, to the TSSP.

Figure 4:
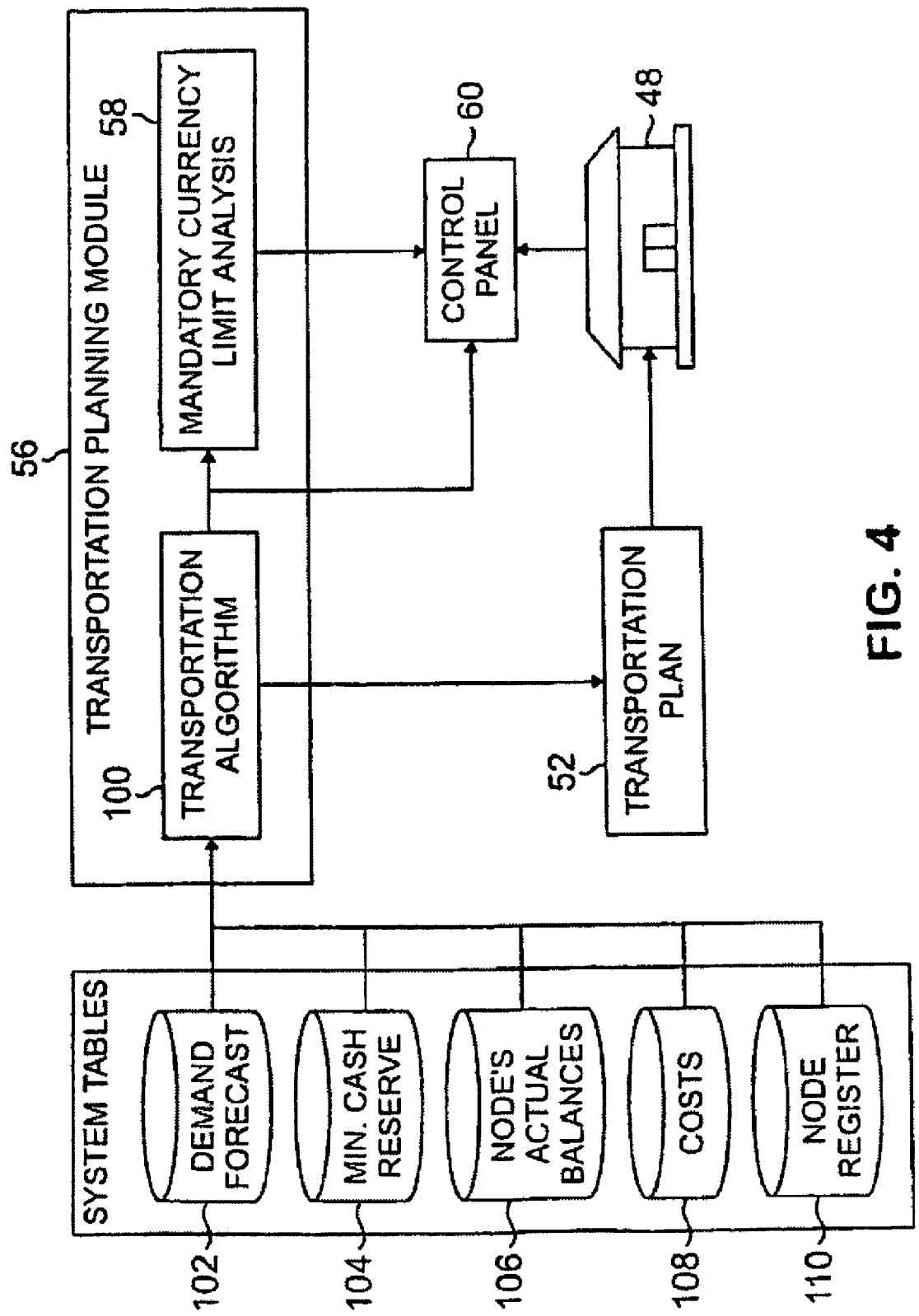
FIG. 4 is a simplified block diagram showing a currency transportation planning module.

FIG. 4 is a simplified block diagram showing transportation planning module 56, which may also be referred to as a transportation module. The module balances various costs, such as transportation costs and storage costs, while taking into account the forecast demand for each network node or group of nodes. Efficient transportation planning can result in direct cost reductions, such as lower costs related to lost or stolen currency and the ability to better contract for the provision of transportation services. It can also result in indirect cost reductions, such as by freeing qualified staff to perform activities other than currency handling. Transportation algorithm 100 can accept various types of data, for example, demand forecast 102, minimum cash reserve limits 104 for each node, actual current currency balances for each node 106, various costs 108 associated with handling currency, and information from node register 110.

As an initial concern, the algorithm will take into account the current branch balances in combination with forecast demand for each branch or group of branches in determining the schedule and size of currency shipments to each branch, for example, for the coming week. In computing the needed shipments, module 56 will attempt to minimize, to the extent practicable, the costs associated with the shipment, processing, and storage of the currency and may include costs relating to lost or stolen currency. Transportation planning module may also, in appropriate circumstances, incorporate functionality from TSSP Module shown in FIG. 2 and described above.

Referring again to FIG. 4, the cost minimizing calculation may occur by any of a number of well-known processes for minimizing total cost over multiple variables. As part of the calculation, storage limit parameters may be taken into account to ensure that no entity will need to hold more currency than is advisable. In particular, security and possible robbery costs may place an upper limit on the amount of currency that may be maintained by any particular entity, such as a central vault, a branch location, an ATM, or an armored car. Other parameters may also set hard limits on the cost calculation, or may be taken into account as a flexible factor in calculating costs.

Transportation algorithm 100 may also produce output in a variety of ways. For example, output may be placed in an overall transportation plan 52 that may be made available to network nodes, such as node 48. Each transportation plan 52 may cover only a node or a group of nodes, or it may also cover all of the nodes in a particular financial system or sub-system. Control panel 60 may provide for review of the output of transportation algorithm 100 and transportation plan 52. Furthermore, the calculations from transportation algorithm 100 may be subjected to mandatory cash limit analysis 58, either after the algorithm has been conducted or as part of the algorithm itself (not shown). The output of transportation algorithm 100 may be reviewed by management of the financial institution and may be subjected to further manual or automatic refinement.

Figure 5:
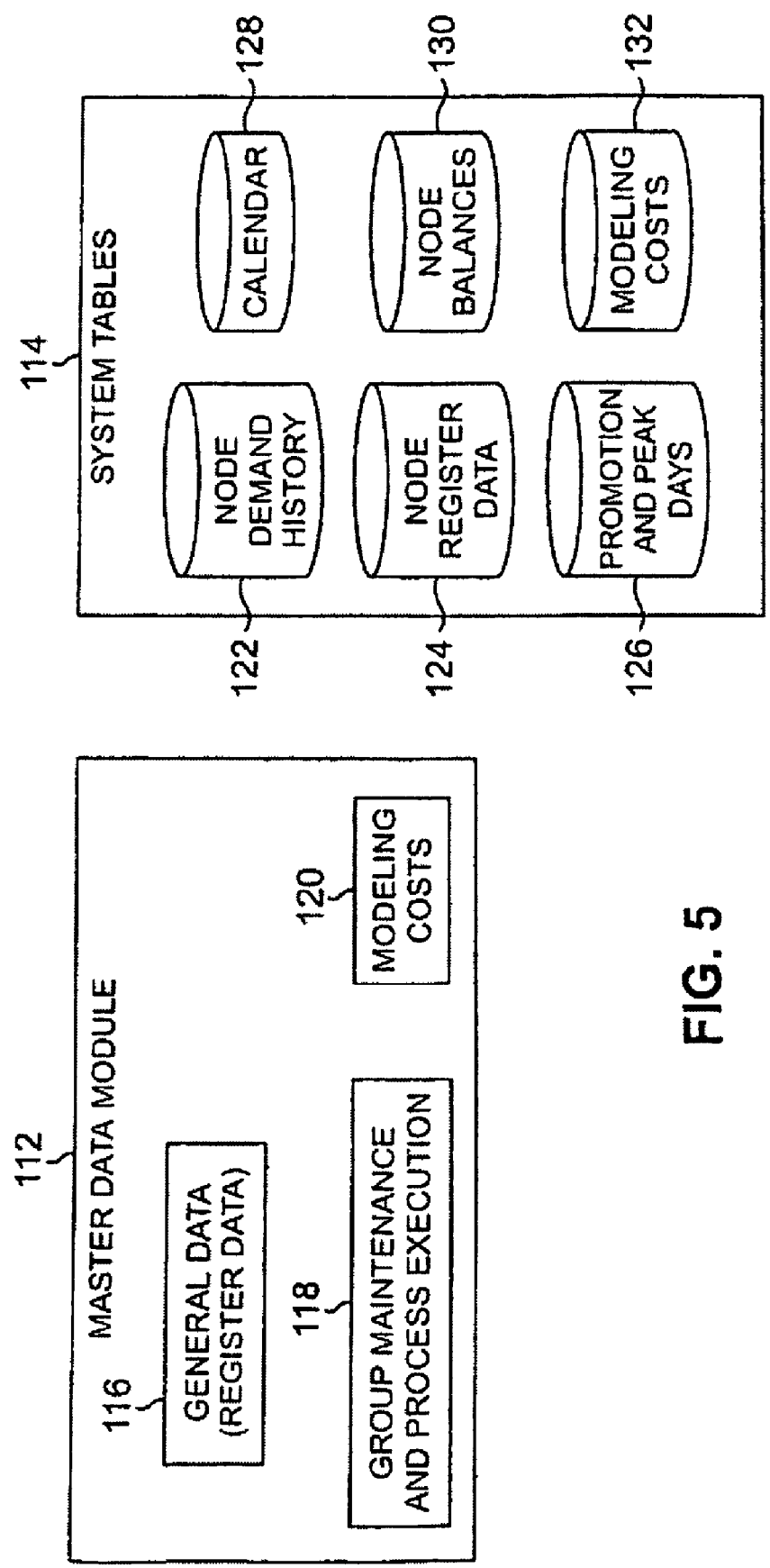
FIG. 5 shows examples of data modules and system tables that may be used with a currency demand module.

FIG. 5 shows examples of data modules and system tables that may be used with a demand module. For example, master data module 112 may contain general data module 116 to store general information about the financial system and the various nodes within a system or sub-system. Group maintenance and process execution data 118 stores data that may be used to treat particular nodes within a system as a group, so that certain calculations may be performed on them in the aggregate, or they may be included or excluded from consideration together. Process evaluation data relates calculations and processes performed by the system to one or more groups of branches. For example, if the user relates "group 1" to the demand planning process, the system will calculate the demand forecast only for the branches included in "group 1." Modeling costs data 120 may comprise information that approximates the actual costs that are encountered in the financial system. These costs may be balanced by the transportation planning module and other modules to create a plan that meets all planning and regulatory requirements at a minimum cost to the financial institution. These costs may include actual costs for storage (such as rent, security, utilities, and handling), for transportation (such as leasing costs, labor, security, maintenance, handling, etc.), processing costs, and even robbery costs (i.e., the losses in currency that can be expected due to robberies, employee theft, and other such currency losses).

System tables 114 can contain additional information needed by the currency management system. For example, branch demand history 122 can be used to plan expected currency demand for a node on the network. This history may, for example, track demand at a node for the past six to thirteen months from a volumetric perspective, and can include "differential" data for particular days that may have non-typical demand, such as holidays going back several years. Promotion and peak days register 126 and calendar 128 can be applied to branch demand history 122 to create a modified expected demand based on predictable demand effects. Promotions are sporadic events that take place in certain nodes on specific occasions, such as traditional festivities, shows, fairs, etc. Peak days are those in which demand is much higher than normal, such as local company paydays. This information may be supplied by branch managers themselves. Calendar 128 may include information that relates to days on which the node (or particular entities of the node, such as a branch building) will be closed. Node register data 124 and node balances 132 may also be used to determine the expected need by a node for currency. Modeling costs 132 may include other costs of each node that can influence the system's decision making process, and include storage costs, transportation costs, insurance, and other costs that can derive from statistical data or from information such as contract rates for various services used by a node. This list of available data is not meant to be limiting, and the data used by the system could be arranged in any of a number of ways in a single database or in multiple databases.

Figure 6:
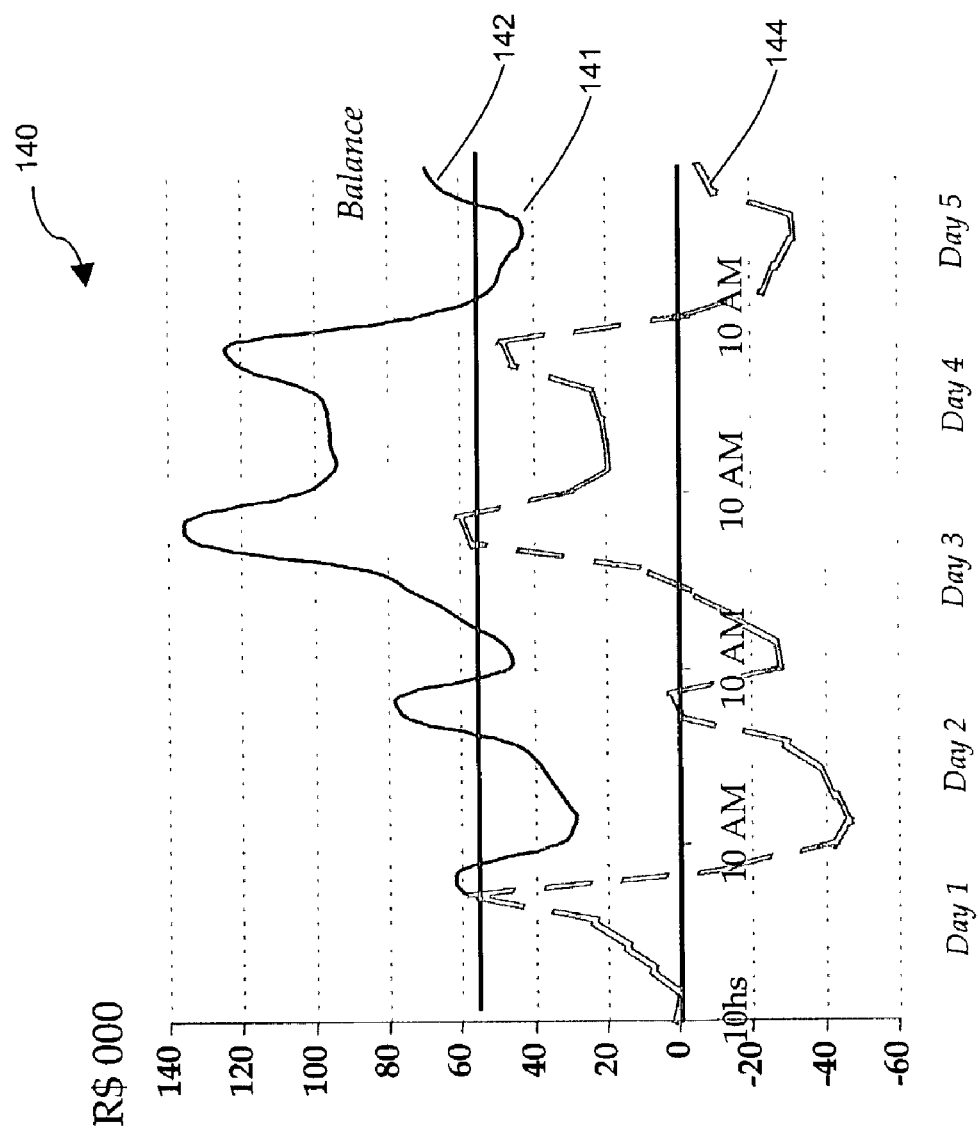
FIG. 6 shows a graph of the currency balance for a bank branch.

FIG. 6 shows a graph 140 of the currency balance for a particular branch. The balance is computed at equivalent time periods throughout each day for five days, with the beginning of each day being a the opening time for the branch. Line 144 represents the predicted currency balance for the branch if no supply or collection of currency is provided. Line 142 represents the predicted currency balance if supply and collection of currency is provided to the branch. The particular balance curve shown by line 142 indicates that the branch's balance is expected to increase slightly over the coming week, particularly if currency delivery is provided.

The demand forecast can be computed so as to minimize the need for supplies and collections of currency. In particular, collections and supplies should be calibrated so that the balance for the following day or days is less than the overnight limit for the branch (line 141) but more than the branch's minimum reserve. Thus, a projection of currency demand for a branch looking forward several days can be used to determine the amount to collect when a collection is necessary, so as to minimize the need for future collections or supplies. For example, if the projection indicates that withdrawals will be higher than deposits over the coming week, any collection of currency can be just enough to bring a branch below its overnight limit. In contrast, if the projection indicates that deposits will be higher than withdrawals, the collection can take more currency, and may bring the balance closer to the minimum reserve for the branch (i.e., so that the balance has room to grow without hitting the overnight limit). In particular, a collection or supply amount may be computed that prevents the balance from falling below the minimum reserve or above the overnight limit for the followings days in the forecast period.

Figure 7:
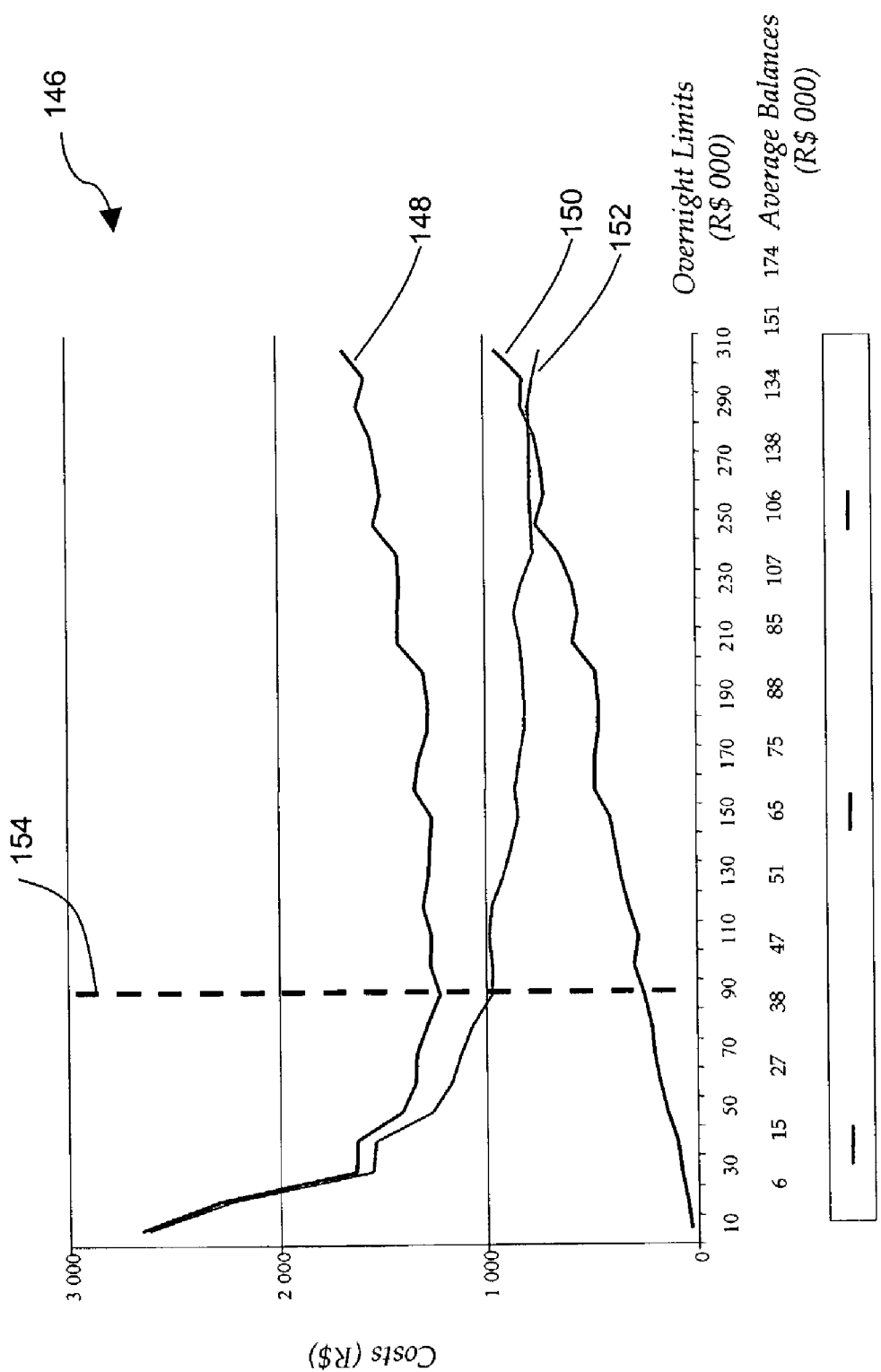
FIG. 7 shows a graph of currency handling costs.

FIG. 7 shows a graph 146 of currency handling costs. Line 152 presents transportation costs as a function of overnight limits and average balances. In particular, as the overnight limit is increased, fewer collections of currency are required, and transportation costs fall. Line 150 represents robbery costs as a function of overnight limits and average balances. In particular, as the overnight limit is increased, more currency may be stored at each branch, and each robbery is likely to be more damaging. Line 148 represents total costs of handling currency, and is the sum of transportation costs and robbery costs. Other costs, both direct and indirect, could also be taken into consideration in calculating total cost. Line 154 represents the overnight limit and average balance that provide a lowest cost level—i.e., it is the minimus of line 148. These various costs (and similar costs for other branches in a financial system) may be taken into account by the transportation module in designing a transportation plan.

Figure 8:
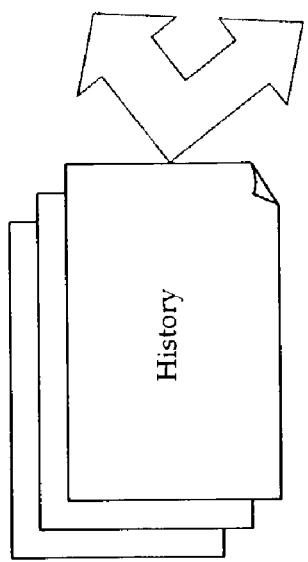
FIG. 8 shows data, in tabular form, that can be used to calculate the expected demand for a branch.

FIG. 8 shows data, in tabular form, that can be used to calculate the expected demand for a branch. The data can be generated from historical demand patterns for the branch, as explained above. The Demand Forecast Table shows the currency flow for a branch on peaks days, on normal days during the first two weeks of a month (the first fortnight) and on normal days during the second two weeks of a month (the second fortnight). The table shows the amount of deposits and withdrawals through tellers, and also shows the withdrawals from ATMs that are only open during the normal branch hours ("Self-Service") and twenty-four hour ATMs (which are available every day of the week). The Demand Distribution per Hour table shows the time curve allocation of demand across the hours of a normal working day (and during non-working hours for ATMs). The demand for each hour of the day may be calculated by multiplying a value from the Demand Forecast Table by the appropriate allocation in the Demand Distribution per Hour table. Alternatively, the demand forecast and demand distribution for each branch may be combined into a single table that shows all of the figures for a financial system or sub-system.

FIG. 9 shows a table of the transportation costs for a particular branch. Each branch is provided with a unique identifying code. In addition, the branch name is provided for reference, and may be obtained from a separate database or table that correlates branch codes to branch names. The manner in which transportation is contracted is shown for both supply and collection, with the "R" in the figure representing that the branch has a Routine Contract with a third party carrier for supply and collection. This contract, for example, gives the branch twenty-two supplies in a month period, limited to one stop for supply per day. In the example, the branches pay R$ 1250.26 (US$ 520) per month for twenty-two supplies and R$ 1250.26 for twenty-two collections in a month. Usually banks restrict the size of the supply due to security reasons: for example, the maximum amount that can be delivered per stop is US$ 100,000. If, by chance, a branch operating under the Routine Contract needs US$ 150,000 to operate in a specific day, it will have to ask for two stops on the same day. As shown in the table, each extra trip will cost R$ 75.86 (US$ 30). In general, collections under a contract may be limited in size, and one or more collection per day may be made. The routine amount generally must be paid even if all twenty-two trips are not used.

In addition, the costs both for supplying money to, and collecting money from, a branch are shown for routine, eventual, and emergency transportation. Routine transportation cost is the cost of expected and scheduled shipments, while eventual transportation cost is the cost for unexpected shipments for supply or collection, and emergency transportation cost is the cost of providing or collecting currency on very short notice. In the table, the emergency cost illustrated is the cost per supply or per collection while the routine cost illustrated is the cost per month.

FIG. 10 shows a table of region-by-region expected robbery costs that may be applied to branches within each region in calculating the costs facing those branches. The total number of robberies in each region, along with the total amounted robbed, and the amount preserved are listed. The robbery rate, or loss rate, may be computed as the product of a robbery, which is the amount robbed in a certain period (amount robbed) divided by the amount available in the branch when robberies occur (amount robbed+amount preserved), and a daily robbery probability, which may be computed as the number of robberies divided by the number of branches and the number of days in the period. From these figures, a daily robbery probability may be computed and may be multiplied by the cash amount at risk to provide a measure of an expected robbery cost. Other appropriate methods of computing an expected loss to robbery may also be used.

Figure 11:
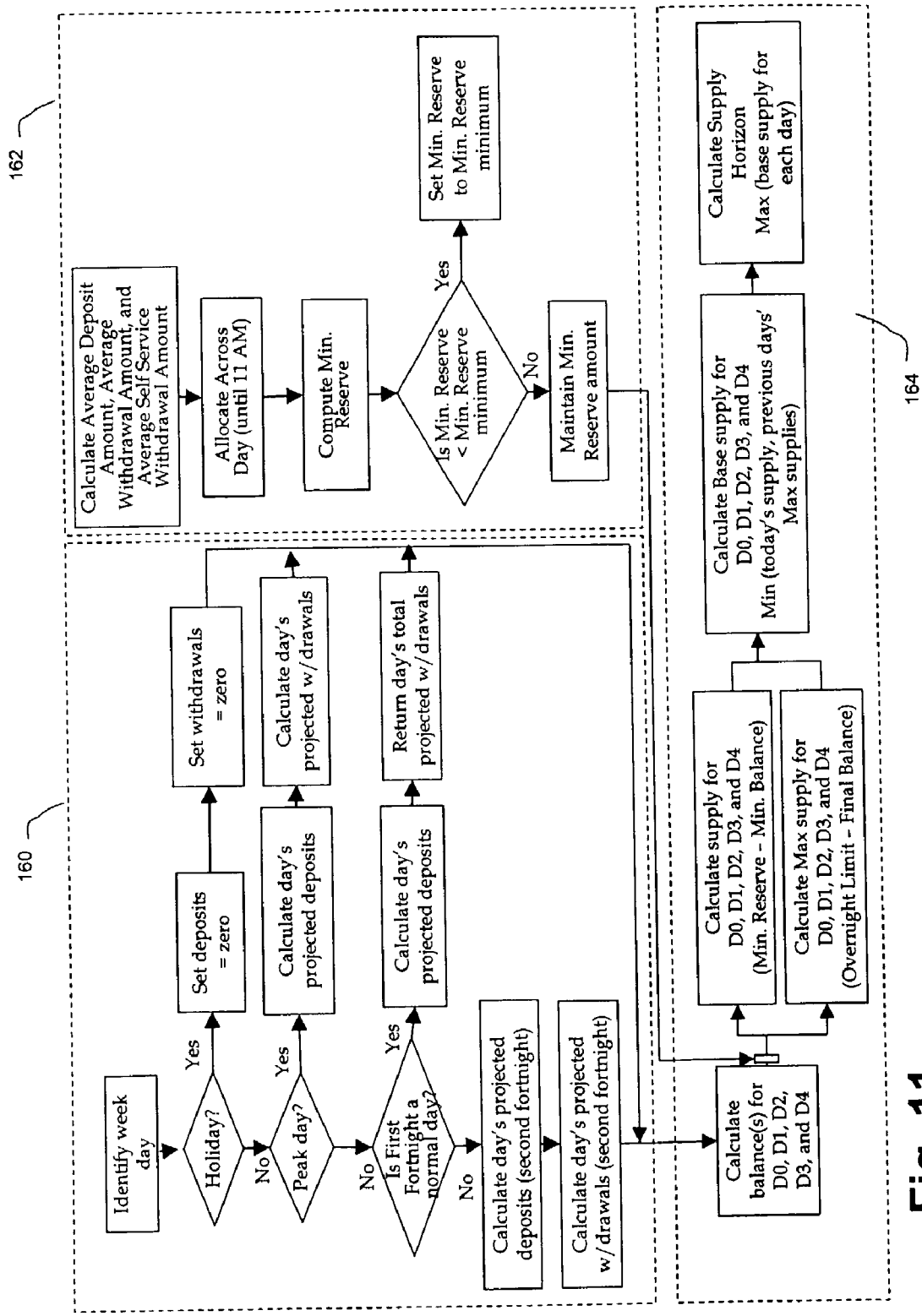
FIG. 11 is a flow chart that shows steps for calculating the supply of currency needed for a node in a financial network.

FIG. 11 is a flow chart showing steps for calculating the supply of currency needed for a node in a financial network, such as a bank branch. The flow chart includes a demand portion 160 which calculates the projected demand for a node, a minimum reserve portion 162 which calculates the minimum balance that the node should maintain, and a supply portion 164 which computes the supply of currency that may need to be provided to the node over a period of time, such as several days.

Demand portion 160 may be configured to calculate expected demand for a period into the future, such as a five-day planning horizon. As shown in the figures, five days are indicated by the labels D0 through D4, from the present day forward. For each day, the demand portion 160 determines whether the day is a holiday, a peak day, or a normal day in the first fortnight of the month. If the day is neither a peak day, a holiday, nor a normal day in the first fortnight, it is a normal day in the second fortnight of the month. Demand portion 160 then computes the expected deposits and withdrawals for each relevant day and for each component of the node. For example, for a holiday, a branch will be closed, so that withdrawals and deposits are set to zero, while an ATM may be open and may need to have withdrawals (but not deposits) calculated. However, the ATM might not be able to be replenished on a holiday, so demand portion may add the forecast demand to the previous day's demand and return the total ATM withdrawals to zero. For any operating day, the historical data can be used to compute deposits and withdrawals for a branch and withdrawals for an ATM.

Minimum Reserve portion 162 may be configured to compute the minimum balance that can safely be kept overnight at a branch so that expected demand for the first hour of the next day may be met. Using demand forecast data, the average deposit amount, the average withdrawal amount, and the average self-service withdrawal amount for the day may be computed. Each amount may then be allocated across the hours of the workday using the time demand distribution data of the demand curve for the node (as illustrated in FIG. 8). The minimum reserve may then be computed as the net sum of the deposits and withdrawals at a time in the day when currency can first be replenished, e.g., one hour after the node opens for business. The process may then determine whether the computed minimum reserve is less than a minimum reserve minimum which is determined by the user, such as by using the minimum allowed balance dictated by the financial institution's policies or by government regulation. If the computed minimum is less than the minimum reserve minimum, then the computed minimum is set equal to the minimum reserve minimum. Alternatively, the computed minimum is maintained as the minimum reserve. The minimum reserve for an ATM can be computed in a like manner, but without considering the effect of any deposits.

Supply portion 164 may be configured to compute the currency balances over a simulated period, based on the assumption that there will be no supply or collection of currency. For branches, the minimum day balance may be computed for each day (e.g., D0 through D4) using the projected deposit and withdrawal data computed in demand portion 160. For ATM's, the final balance may be computed. Generally, the minimum balance for an ATM does not need to be separately computed because the minimum balance will be the same as the final balance.

The supply horizon (SH) for the node—i.e., the amount of currency that must be supplied or removed at some point during the simulated period so that no other supplies or removals will be required—may then be calculated. First, the minimum reserve from portion 162 is compared to the minimum balance for each of the days. The differences are denoted by the variables SupD0 through SupD4. These figures represent the amount of currency that must be supplied to the branch for a particular day to ensure that the minimum reserve is not violated. In addition, the final balance for each day is subtracted from the overnight limit. The results are denoted by the variables MaxD0 through MaxD4, and represent the amount of currency that may be added to inventory during the following day without violating the overnight limit for the following night.

The base supplies for each day may then be computed. The base supply for D0 is simply SupD0—the amount needed to ensure that the minimum reserve is not violated. The base supply for D1 is the lesser of SupD1 and Max D0. In this manner, currency may be supplied to ameliorate at least some of the shortfall for the day, but the amount supplied will not be so much as to require an additional currency collection later in the day to avoid violating the overnight limit. The base supply is also calculated for the remaining days by selecting the minimum of the particular day's computed supply and the final balances for the previous days. For example, the computation for the fifth day can be represented as follows:

BaseSupD4=Min(SupD4,MaxD0,MaxD1,MaxD2, MaxD3)

Likewise, the base supplies for the other days are represented by the variables BaseSupD0 through BaseSupD3. The base supply represents the minimum amount that can be supplied to the branch on each of the days without causing a collection in the days before.

Finally, the supply horizon for the branch may be computed as the maximum of the required base supplies for each of the days in the plan. The computation may be represented as follows:

SupplyHorizon(SH)=Max(BaseSupD0, . . . BaseSupD4)

The supply horizon represents the amount that will need to be delivered to the branch so that the branch will have adequate currency inventory for the planned period. Likewise, the supply horizon for an ATM may be calculated in a similar manner. However, because the ATM balance will generally always be decreasing, the calculation is less complicated. The amount by which the ATM is below its maximum inventory on D0 (MaxD0_ATM_sup) and the amount by which it is expected to be above its minimum inventory for the planned period (MinD4_ATM) may be computed, and the supply for the ATM, denoted MaxATM_sup, may be the minimum sum of those two values, as follows: MaxATM_sup=Min(MaxD0_ATM_sup, MinD4_ATM)

In addition, delivery limiting amounts (DLAs) may be computed from the above values. The DLAs reflect the currency that may be delivered by the minimum number of required shipments if the shipments are full. In particular, to compute the DLA for a branch for D0, SupD0 is divided by the delivery limit, which is the amount that can be supplied by one delivery. The quotient is then rounded up to the next whole amount to give the number of required deliveries. That number is then multiplied by the delivery capacity for each delivery to provide the DLA. The DLA for an ATM can be computed in a like manner. The combined DLA for a branch and ATM (or for multiple branches or other combinations of nodes) is the total supply for both entities divided by the delivery limit, rounded up to the next whole value, and multiplied by the delivery limit.

Figure 12:
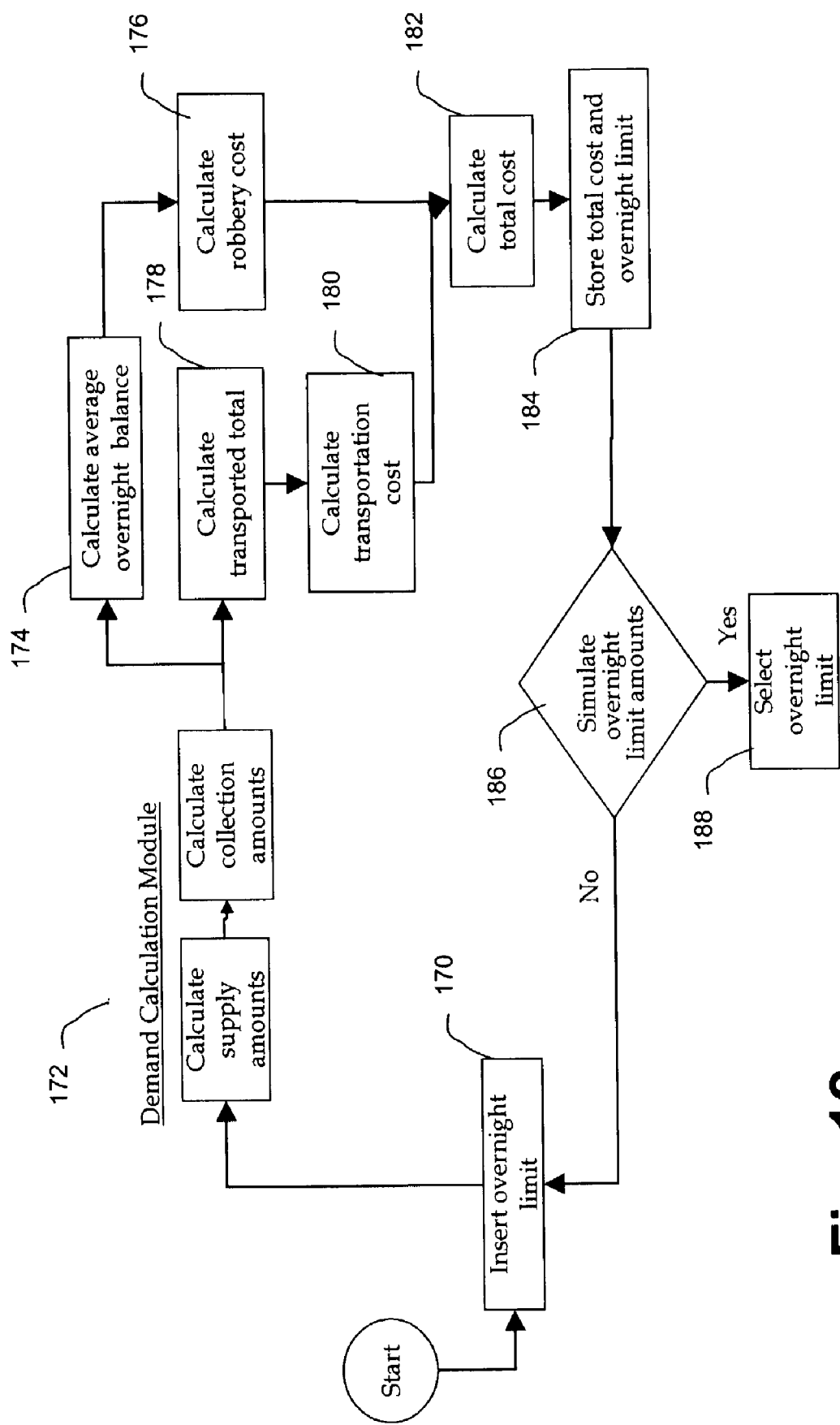
FIG. 12 illustrates a flowchart for assigning an overnight limit to a node in a financial network.

FIG. 12 illustrates a flowchart for assigning an overnight limit to a node in a financial network. In general, the process is an iterative process in which costs are computed for various overnight limits within a range that has been determined, for example, empirically, to be acceptable possible overnight limits, and that can be used to generate the table shown in FIG. 7. The minimum and maximum overnight limit are usually defined by the financial institution as is the pace of variation. For example, the financial institution might define the minimum overnight limit as 50, maximum as 250 and pace of variation as 10. In such an example, the various overnight limits to compute the costs for each iteration would be 50, 60, 70, . . . 240, 250. The process takes into account the projected currency demand for a node, and the transportation costs and robbery costs for the node. In addition, other costs could also be considered, as discussed above. The general goal of the process is to select an amount that is sufficient to meet expected demand, but that minimizes costs to the extent practicable.

The process begins at block 170, where a proposed overnight limit is selected as a starting point from a range of possible overnight limits, e.g., 50 in the example above. Using that overnight limit, projected demand data, and other appropriate parameters such as minimum reserve amounts, Necessity Calculation Module 172 computes projected supply and collection amounts for the branch over the period of interest (e.g., several days). The average overnight balance for the period can be calculated at box 174, and expected robbery costs may be computed at box 176, as described above. Likewise, the value of the transported currency may be computed at box 178, and the transportation cost may be calculated at box 180, as described above. The transportation cost may be, for example, the product of shipping stops and costs per stop added to the product of the transported currency amount and an ad valorem rate. The robbery cost may be, for example, the average balance multiplied by the product of the robbery probability and the loss rate.

At box 182, total cost may be computed by adding all of the individual cost components—in the embodiment shown, transportation costs and robbery costs—and the computed values may be stored at box 184 for comparison with computed costs for other overnight limits. If the costs for each possible overnight limit amount have been computed, as determined by box 186, an overnight limit, preferably with the lowest total cost, is selected at box 188. If each overnight limit of interest has not been considered, the cost calculation may be repeated, starting at box 170 with a new proposed overnight limit.

Figure 13:
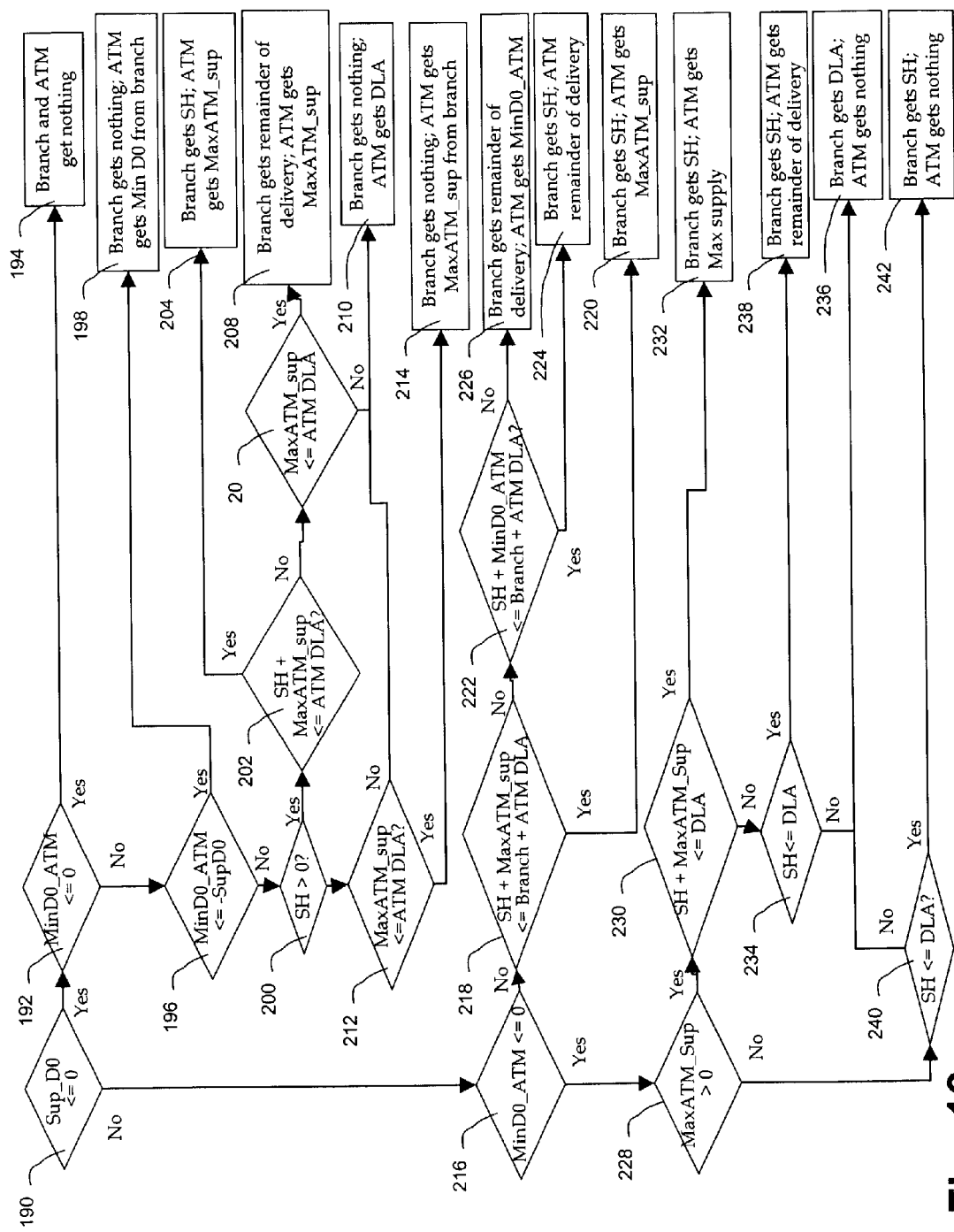
FIG. 13 illustrates a flow chart of a process for computing supply amounts for a branch and an associated ATM over a set time horizon.

FIG. 13 illustrates a flow chart of a process for computing supply amounts for a branch and an associated ATM over a set time horizon. In general, the supply amounts that have been calculated for each entity's supply horizon, as discussed above, are considered in conjunction with the delivery limiting amount (DLA). In addition, currency may be exchanged between the branch and the ATM if one has excess inventory and the other has insufficient inventory, so as to minimize the number of required deliveries.

Starting at decision box 190, the process determines whether Sup_D0 is less than zero, so that there would be no need to supply currency to the branch on the first day. If there is no need, the process checks at 192 to see if the ATM can operate satisfactorily without a delivery. If it can, then no deliveries are made, as indicated at 194. If the ATM needs a delivery, but its requirement is less than the excess held by the branch, as tested at 196, the ATM's needs may be supplied from the branch, and no delivery is required, as shown at 198.

If the branch does not have sufficient excess to supply the ATM, the process tests at 200 whether the supply horizon is greater than zero. If it is not greater than zero, then there is no expected need for currency for the branch during the planned period, and the process tests at 212 whether MaxATM_Sup (the maximum amount that is expected to be supplied to the ATM in the period) is less-than-or-equal-to the ATM's DLA. If it is, the ATM gets its required supply, MaxATM_Sup, and the branch gets nothing, as shown at 214. If it is not, the ATM gets its delivery limit and the branch gets nothing, as shown at 210.

If the supply horizon is greater than zero, meaning that there is need for currency for the branch during the planned period, the process determines at 202 whether the sum of the supply horizon and MaxATM_Sup is less-than-or-equal-to the ATM's DLA. If it is, there is room in the delivery for both entities (the branch and the ATM); the branch therefore gets its supply horizon and the ATM gets its maximum supply, as shown at 204. If there is not room for both entities, the process determines at 201 whether the needs of the ATM can be served by the delivery. If they can, the ATM gets its needs fulfilled (via delivery of MaxATM_sup) and the branch gets the remainder of the delivery, as shown by 208. If both cannot be served, the ATM gets the entire delivery and the branch gets nothing, as shown at 210.

If the branch requires a supply, the process determines at 216 whether the ATM's balance (above its minimum) on the first day is zero or negative. If it is not, the process determines at 218 whether the sum of the supply horizon and MaxATM_Sup is less-than-or-equal-to the DLA for the two entities combined. If it is, the delivery can supply both entities fully; as shown at 220, the branch gets its supply horizon and the ATM gets its needs. If it is not, the process checks at 222 whether the supply horizon for the branch and the first-day needs of the ATM can be met. If so, the branch gets currency sufficient to meet its supply horizon, and the ATM gets the remainder of the shipment, as shown at 224. If not, the ATM gets what is needed for the first day, and the branch gets the remainder, as shown at 226.

If the ATM has no immediate need, as indicated by the "yes" outcome of 216, the process checks at 228 to determine whether the ATM will have a need during the simulated period. If it will, the process checks at 230 to determine whether the supply horizon needs of the branch and the total needs of the ATM can be met by the DLA. If they can, they each get those amounts, as shown at 232. If they cannot, the process determines at 234 whether the branch's supply horizon can be met by the DLA; if it can, the branch gets the supply horizon and the ATM gets the remainder (at 238), while if it cannot, the branch gets the entire delivery and the ATM gets nothing (at 236).

Finally, if the ATM has no needs for currency over the simulated period, as shown by the "no" arrow from 228, the process determines, at 240, whether the supply horizon for the branch can be met by the delivery. If it cannot, the branch simply gets the DLA, while if it can, the branch gets its supply horizon.

It should be recognized that means other than those just described for computing the currency to be supplied to the various nodes in a financial network may be used and do not depart from the present invention. For example, additional factors may be considered in determining the demand from a node and the costs for supplying, storing, and handling currency. Also, the inventory limits discussed above (e.g., minimum reserve and overnight limit) could be based on other factors, including factors that can allow for slight violations of the applicable limits (e.g., a minimum reserve could be lowered if other factors indicate that the branch can meet its expected currency needs). Likewise, multiple nodes could be combined in a single delivery, or groups of deliveries could be split in different manners among several nodes, such as nodes that are in close geographic proximity. Moreover, the currency needs of nodes may be computed using different steps, and the steps may be arranged in any appropriate order.

Figure 14:
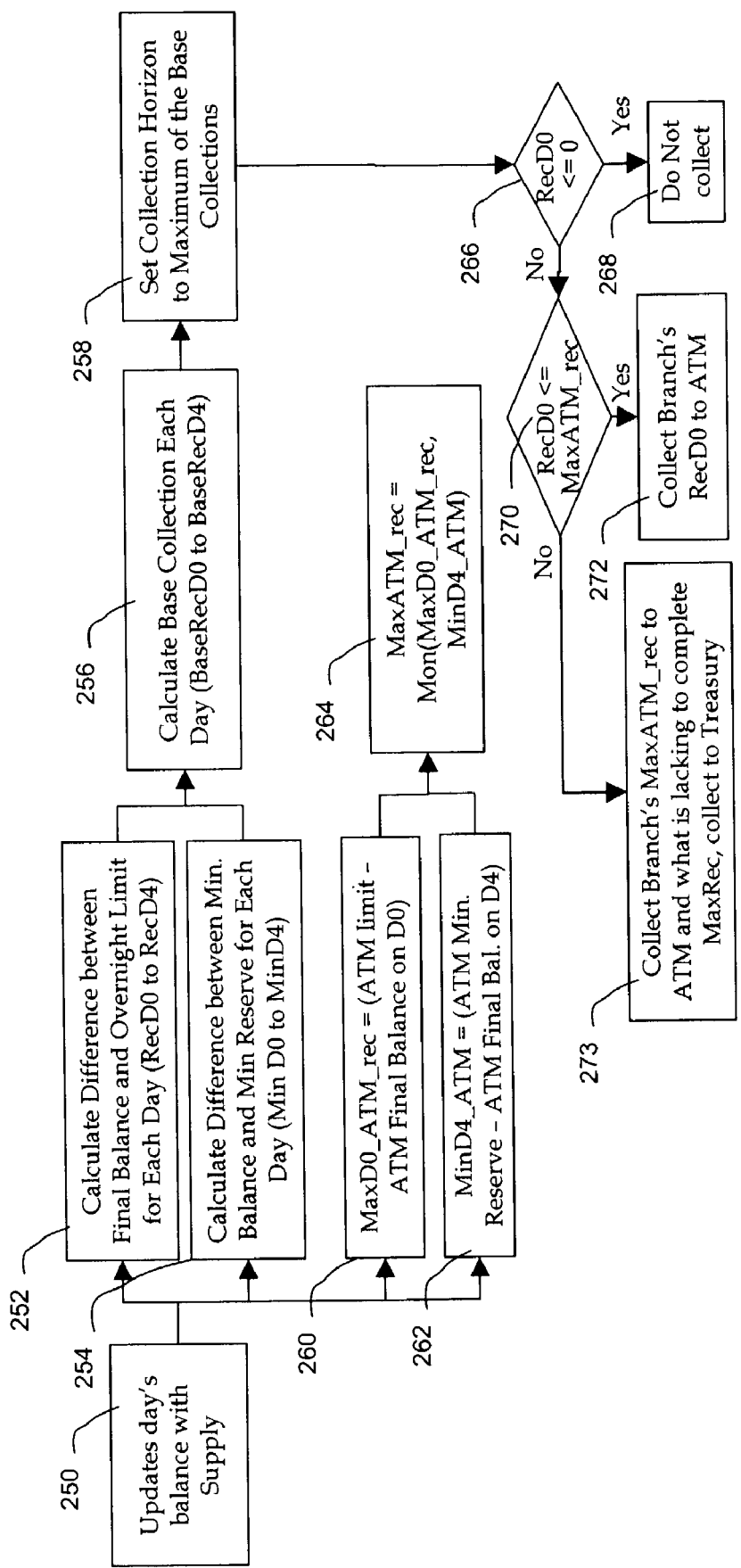
FIG. 14 illustrates a flow chart of a process for computing the required currency collections from a node in a financial network

FIG. 14 illustrates a flow chart that shows a process for computing the required currency collections from a node in a financial network. In box 250, the balance for the node is updated using the expected deposits and withdrawals, and the currency supplied to the node. Various values for computing the needed collections are then computed. The difference between the final balance and the overnight limit for each day represents the amount by which the branch will exceed its storage limit, and is referenced as RecD0 through RecD4 at box 252. The difference between the minimum balance and the minimum reserve for each day represents the closest that the branch will coming during the day to violating its minimum reserve, and is referenced as MinD0 through MinD4 at box 254. Thus, the calculations for the branch for the first day may be expressed as follows:

RecD0=Final Balance D0−Overnight Limit

MinD0=Minimum Balance D0−Minimum Reserve

The base collection for each day can then be calculated, at box 256, as the minimum of the excess above the storage limit for that day and the balance above the minimum reserve. For example, the base collection for the days in a five-day plan can be expressed as follows:

BaseRecD0=RecD0

BaseRecD1=Min(RecD1,MinD1)

BaseRecD2=Min(RecD2,MinD1,MinD2)

BaseRecD3=Min(RecD3,MinD1,MinD2,MinD3)

BaseRecD4=Min(RecD4,MinD1,MinD2,MinD3, MinD4)

The collection horizon (RH), which represents the amount that must be collected to ensure that no other collections under the simulation will be needed for the planned period, is computed at box 258 as the maximum of the base collections for each of the days.

The collection horizon for an ATM may also be computed. At box 260, for example, the space left in the currency inventory for the ATM at the end of the first day may be computed as the difference between the ATM limit and the ATM's final balance at the end of the first day, and is represented as MaxD0_ATM_rec. At box 262, the amount by which the expected balance will fall below the minimum reserve on the last day is calculated as the difference between the ATM minimum reserve and the ATM's final balance, and is represented as MinD4_ATM. The amount of currency that can be supplied to the ATM, according to the ATM's needs for the planning period and the ATM limit, represented as MaxATM_rec, may then be calculated at box 264 as the minimum of MaxD0_ATM_rec and MinD4_ATM.

Computation of the collection amounts for a branch and an ATM may begin at decision block 266. There, the process determines whether the final balance at the end of the first day is less than the overnight limit. If it is, then there is no need for a collection, as shown at 268. If it is not, the process determines at 270 whether the difference between the final balance and the overnight limit is less-than-or-equal-to MaxATM_rec, indicating that whether there is room for more currency in the ATM. If the difference is less-than-or-equal-to MaxATM_rec, then the branch's excess is moved to the ATM, as shown at box 272. If the difference is more than MaxATM_rec, then the amount needed to fill the ATM is moved to the ATM from the branch, and the remainder is collected, e.g., to the financial institution's central storage facility.

Figure 15:
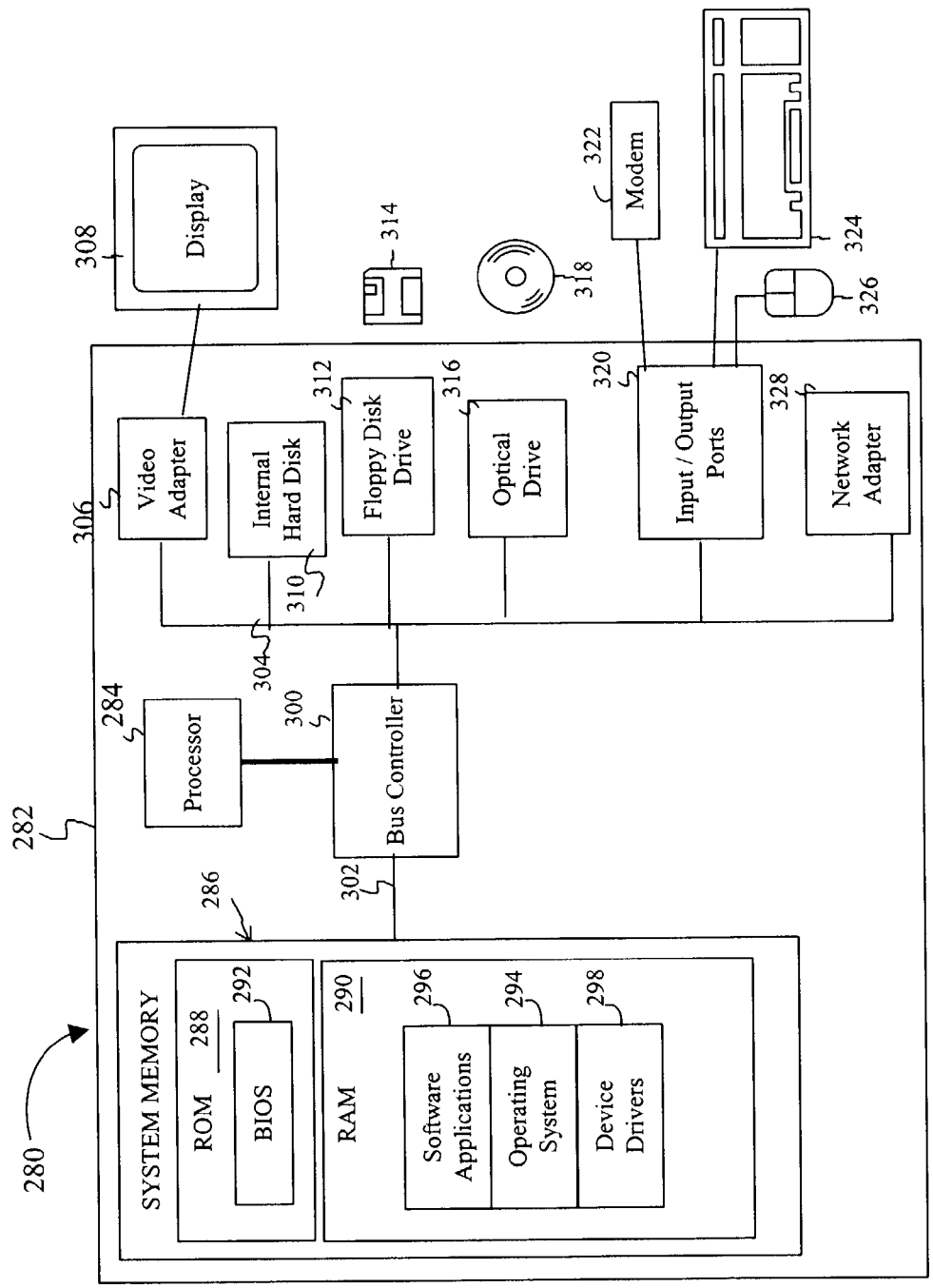
FIG. 15 illustrates a programmable computing system that provides an operating environment suitable for implementing the techniques described with respect to the other figures.

FIG. 15 illustrates a programmable computing system 280 that provides an operating environment suitable for implementing the techniques described above, either as a central information repository, as a remote terminal, or as a portable device, and which may be used in combination with other such devices. The system 280 includes a computer 282 that contains a processor 284 connected to system memory 286 through bus controller 300 and system data/address bus 302. Memory 286 includes read only memory (ROM) 288, which may include BIOS 292 or other components, and random access memory (RAM) 290, which may be used to store an operating system 294, software applications 296, and various device drivers 298. In one embodiment, however, software applications 296 are stored in ROM 288 and are copied to RAM 290 for execution, or are executed directly from ROM 288. In various configurations, system 280 represents any mainframe, server, personal computer, laptop or even a battery-powered, pocket-sized, mobile computer known as a hand-held PC or personal digital assistant (PDA). System 280 could also represent a variety of processors, communications devices, and storage devices tied together in a network, included a local area network (LAN), a wide area network (WAN), a virtual private network (Intranet), or the Internet.

Bus controller 300 may connect to other devices through input/output bus 304. For example, input/output bus 304 may support a video adapter 306 connected to display 308 (or multiple displays) to provide visual output for system 280. Bus controller 300 may also support any of a number of input or storage devices, such as internal hard disk 310, floppy disk drive 312, which accepts floppy disk 314, and optical drive 316, which accepts optical disk 318. Other devices, such as modem 322, keyboard 324, and mouse 326, may be connected to input/output bus 304 through input/output ports 320. Other types of input devices (not shown) include track pads, track balls, joysticks, data gloves, head trackers, microphones, and other devices suitable for positioning a cursor on video display 308, or for otherwise providing directions to system 280. In addition, network adapter 328 may be provided to give system 280 access to external resources, such as a LAN, WAN, VPN, or the Internet.

In this manner, the disclosed process may provide a convenient and efficient means to manage currency collection and distribution in a financial institution or financial institutions. It should be understood that various modifications could be made without departing from the spirit and scope of the invention. In particular, the invention is intended to be operable in any of a number of environments, using a mix of functional modules that can operate by a number of processes or algorithms. Accordingly, other implementations are within the scope and coverage of the following claims.

What is claimed is:

1. A computer-based currency management method comprising:
    receiving by a computer information of currency inventory at one or more nodes in a financial network;
    receiving by the computer a forecast for currency demand for the one or more nodes, the forecast for currency demand being for a demand period that is a plurality of days, the forecast defining expected deposits and withdrawals of currency for each of the days in the demand period; and
    establishing by the computer a currency transportation plan for supplies of currency and collections of currency for the one or more nodes based on, for each node, the currency inventory, the forecast for currency demand, and a plurality of costs of handling currency, the plurality of costs of handling currency including a transportation cost and one or more other handling costs, and wherein establishing the currency transportation plan includes:
        calibrating by the computer the supplies of currency and the collections of currency for a plurality of overnight maximum limits for each node so that for each overnight maximum limit an opening balance for a following day is less than the overnight maximum limit and greater than a minimum reserve;
        for each node, selecting by the computer one of the plurality of overnight maximum limits for the node, the selection resulting in a minimization of a sum of the transportation cost and the one or more other handling costs for the node; and
    generating by the computer the currency transportation plan based on the calibrated supplies and collections of currency and the selected overnight maximum limits for each node for the demand period.

2. The method of claim 1, wherein the costs of handling currency include the expected loss of currency from robbery.

3. The method of claim 1, further comprising providing for a manual review of the currency transportation plan, and adjusting the currency transportation plan based on the manual review.

4. The method of claim 3, wherein the manual review is performed by personnel at the one or more of the plurality of nodes.

5. A computer-implemented system for managing currency distribution, the system comprising:
    a computer storage device storing data related to a plurality of network nodes, each network node distributing currency by expected withdrawals and receiving currency by expected deposits, and having a current currency balance;
    a mandatory cash limit calculation and analysis module stored on the computer storage device and programmed and configured to cause a computer to define a plurality of overnight maximum limits for each of the plurality of nodes; and a transportation planning module stored on the computer storage device and programmed and configured to cause a computer to:

create a transportation plan for supplies of currency and collections of currency for each of the plurality of nodes using a currency demand forecast and currency handling costs, the currency handling costs including a transportation cost and one or more other handling costs, the transportation plan being for a demand period that is a plurality of days and based on supplies of currency and collections of currency for each day in the plurality of days, and wherein creating the transportation plan comprises:

calibrating in the computer the supplies of currency and the collections of currency for the plurality of overnight maximum limits for each node so that for each overnight maximum limit an opening balance for a following day is less than the overnight maximum limit and greater than a minimum reserve;

for each node, selecting one of the plurality of overnight maximum limits for the node, the selection resulting in a minimization of a sum of the transportation cost and the one or more other handling costs for the node; and generating in the computer the transportation plan based on the calibrated supplies and collections of currency and the selected overnight maximum limits for each node for the demand period.

6. The system of claim 5, wherein the plurality of nodes includes a first node comprising a bank branch.

7. The system of claim 5, wherein the currency handling costs include the expected loss of currency from robbery.

8. Machine-readable instructions, embodied in a tangible medium and executable by one or more machines, for managing currency inventory in a financial system, execution of the instruction causing one or more machines to perform operations comprising:

receiving information of currency inventory at one or more nodes in a financial network;

receiving a forecast for currency demand for the one or more nodes, the forecast for currency demand being for a demand period that is a plurality of days, the forecast defining expected deposits and withdrawals of currency for in each of the one or more nodes each of the days in the demand period; and establishing a currency transportation plan for supplies of currency and collections of currency for the one or more nodes based on, for each node, the currency inventory, the forecast for currency demand, and a plurality of costs of handling currency, the plurality of costs of handling currency including a transportation cost and one or more other handling costs, and wherein establishing the currency transportation plan includes:

calibrating the supplies of currency and the collections of currency for the plurality of overnight maximum limits for each node so that for each overnight maximum limit an opening balance for a following day is less than the overnight maximum limit and greater than a minimum reserve;

for each node, selecting one of the plurality of overnight maximum limits for the node, the selection resulting in a minimization of a sum of the transportation cost and the one or more other handling costs for the node; and generating the currency transportation plan based on the calibrated supplies and collections of currency and the selected overnight maximum limits for each node for the demand period.

9. The instructions of claim 8, wherein the costs of handling currency include the expected loss of currency from robbery.

* * * * *

UNITED STATES PATENT AND TRADEMARK OFFICE
CERTIFICATE OF CORRECTION

PATENT NO. : 7,813,972 B2  
APPLICATION NO. : 10/215671  
DATED : October 12, 2010  
INVENTOR(S) : Antonio Carlos Menezes Ramos et al.

Page 1 of 1

It is certified that error appears in the above-identified patent and that said Letters Patent is hereby corrected as shown below:

In Claim 8, Column 20, Line 10, after "for" delete "in"

Signed and Sealed this
Fourth Day of January, 2011

David J. Kappos
*Director of the United States Patent and Trademark Office*